Nov. 17, 1936.    H. C. BOWEN    2,060,847
SEALING MEANS
Filed April 21, 1934
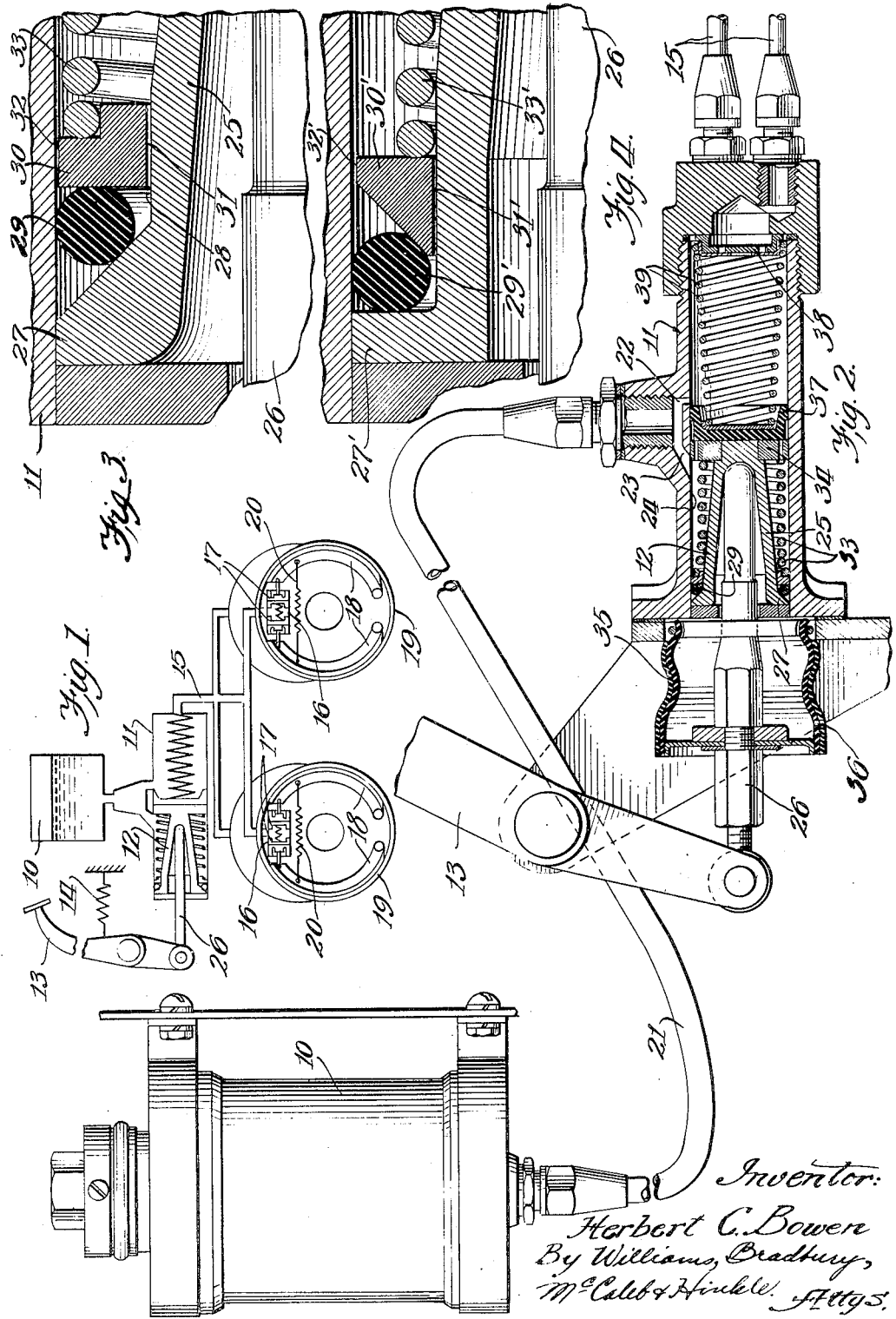

Patented Nov. 17, 1936

2,060,847

UNITED STATES PATENT OFFICE 2,060,847

SEALING MEANS

Herbert C. Bowen, Detroit, Mich., assignor to Hydraulic Brake Company, Detroit, Mich., a corporation of California Application April 21, 1934, Serial No. 721,695

14 Claims. (Cl. 309—37)

My invention pertains to sealing means and is particularly concerned with sealing means for the master cylinders of hydraulic brake systems, although it is equally applicable to other uses.

In hydraulic brake systems and other systems for transmitting power through a fluid medium, it is of the utmost importance that no leakage of fluid occur from the system, and that no air be permitted to enter the system and mix with the fluid confined therein. In a type of system for hydraulic brakes now in common use, one end of the compression or master cylinder is exposed to the atmosphere, and it is essential that the exposed end of this cylinder be provided with a highly efficient sealing means in order to prevent escape of fluid therefrom or entry of air into the system during the operation thereof.

An object of my invention is to provide a new and improved sealing means particularly adapted for sealing the exposed ends of the compression cylinders of hydraulic brake systems and other fluid systems for the transmission of power.

Another object is to provide an improved sealing means which will automatically compensate for any wear which may occur through prolonged usage of the apparatus of which such sealing means is a part.

Another object is to provide an improved sealing means which offers very little frictional resistance to reciprocation of the piston of the compression cylinder.

Another object is to provide an improved sealing means which will automatically adjust itself to irregularities in the parts between which a seal is to be effected.

Another object is to provide a sealing means which can be assembled without distortion of the parts thereof.

Another object is to provide a sealing means which is entirely effective under extreme service conditions.

Other objects and advantages will become apparent as the description proceeds.

This application is a continuation in part of my copending application, Serial No. 636,450, filed October 6, 1932.

In the drawing, Fig. 1 is a diagrammatic illustration of a hydraulic brake system incorporating my invention;

Fig. 2 is a view of the reservoir and master cylinder unit of such a system showing these parts in greater detail;

Fig. 3 is an enlarged view showing the preferred form of my novel sealing means with greater clarity; and Fig. 4 is an enlarged view similar to Fig. 3 but showing a modified form of my invention.

Referring to the drawing, and particularly to Figs. 1, 2 and 3 thereof, I have indicated the hydraulic brake system as having a fluid reservoir 10 connected to a master cylinder 11 having a piston 12 operated by a brake pedal 13 which is returned to normal or off position by a retractile spring 14. The right-hand or outlet end of the master cylinder 11 connects with a fluid conduit system 15 leading to the wheel cylinders 16 having opposed pistons 17 connected with the brake shoes 18 for forcing the shoes into contact with the brake drums 19. The brake shoes 18 and pistons 17 are returned to their retracted positions by springs 20.

The reservoir 10 is normally mounted on the engine side of the dash of an automobile and communicates by means of a pipe 21 with the master cylinder 11 which is usually mounted beneath the floor-board. This communication is normally effected by means of a port 22 leading directly into the right-hand or compression end of the cylinder 11 when the parts are in the retracted or rest positions shown in Fig. 2. The pipe 21 also communicates by way of a port 23 with a recess 24 provided in the piston 12.

I have shown the piston 12 as having a body 25 which provides a socket for receiving the separable piston rod 26 which merely abuts the base of this socket, forming a contact connection therewith. The body 25 has an outwardly extending flange 27 and a cylindrical portion 28 immediately adjacent said flange. A rubber ring 29, which is cylindrical in cross-section, is located adjacent the flange 27 and is pressed against said flange, as well as against the cylinder wall, by an annular washer 30. The surface of the flange 27 against which the rubber ring 29 is pressed is inclined at an angle to the axis of the cylinder. This angle must be sufficient to force the ring 29 firmly against the cylinder wall but must not be so great as to cause a wedging action therebetween which will seriously interfere with the reciprocation of the piston. In practice I have found the most desirable angle for this surface to be from 20 to 70 degrees, measured from the axis of the cylinder, and in the most desirable embodiment of this form of my invention this angle is made 45 degrees.

The inner periphery 31 of the washer 30 is made of slightly greater diameter than the cylindrical portion 28 of the piston, and the outer periphery 32 of the washer is made of smaller diameter than the cylinder bore, so that the washer is, in effect, a floating washer which automatically adjusts itself to variations in the sizes or shapes of the parts resulting from either wear or variations in manufacturing tolerances.

The washer 30 is urged into contact with the ring 29 by a long spring 33 which rests against the piston head 34 which may be secured to the piston part 25 in the manner shown in Fig. 2 of the drawing, or by threads, rivets, or any other suitable means.

I have found that the spring 33 may be a relatively light spring since it is only necessary to press the rubber ring 29 lightly against the cylinder wall in order to obtain an effective seal. This is important since it reduces the friction between the piston and cylinder wall and provides a brake system which is easier to operate and has what is commonly referred to as a "lighter touch."

The left-hand end of the cylinder 11 is shown in Fig. 2 as being closed by a boot 35. This boot is simply a flexible rubber or leather boot which serves to exclude dirt and moisture from this end of the cylinder and is not relied upon to prevent escape of fluid from the cylinder. In fact, this boot is provided with a small opening 36 which maintains the interior of the boot in communication with atmosphere at all times.

Therefore, since the left-hand end of the master cylinder is exposed to atmosphere and since the recess 24 is filled with fluid under a pressure head of two or three feet, it is obvious that my novel sealing means must function efficiently to prevent escape of fluid.

Another important purpose served by my novel sealing means is to prevent leakage of air therepast into the fluid system during the return stroke of the piston. The conditions which tend to produce a leakage of air past this sealing means will be apparent from the following description of the operation of the brake system.

Assuming that the parts are in their positions of rest, as shown in the drawing, and the operator depresses the pedal 13, the piston 12 is advanced to the right as shown in the drawing. The first result of this movement is that the rubber cup washer 37, associated with the forward face of the piston, closes the port 22, and thereafter the continued advance of the piston forces fluid from the right-hand end of the cylinder 11 past the double check-valve 38 and into the conduit system 15. The check-valve 38 is disclosed and claimed in Erwin F. Loweke Patent No. 1,885,121, dated November 1, 1932, and need not be further described herein. This discharge of fluid into the conduit system produces a separation of the pistons 17 in the wheel cylinders, thereby forcing the brake shoes 18 into engagement with the brake drums 19.

When the operator releases his foot, the pedal 13 and piston rod 26 are returned by spring 14 independently of the other parts of the system. The piston 12 is normally returned by spring 39 faster than fluid is returned to the master cylinder past the restricting valve 38 by the wheel cylinder pistons 17 which are retracted by springs 20. A sub-atmospheric pressure is thereupon created in the right-hand end of the master cylinder, and during the return stroke of the piston 12 the cup washer 37 collapses and permits fluid to flow from the annular space 24 through passageways 40 in the piston head and past the cup washer into the right-hand end of the master cylinder. It is at this time that there is a tendency for air to be sucked past the sealing ring 29.

After the piston 12 reaches its rest position, as shown in Figs. 1 and 2, the port 22 again establishes free communication between the reservoir 10 and the right-hand end of the master cylinder, so that any excess fluid which has been sucked past the piston 12 during its return stroke can return to the reservoir 10 as the wheel cylinder pistons 17 complete their return movements.

In assembling the piston 12, the ring 29, wedge 30, and spring 33 are assembled on the part 25 before the head 34 is secured to said part. This method of assembly is an advance over present practice wherein it is necessary to stretch a rubber annulus over a confining projection before the rubber annulus can be located in the groove adapted to receive it. This initial stretching of the rubber annulus tends to distort it and reduce its effectiveness as a sealing means.

In a preferred form of that embodiment of my invention shown in Figs. 1 to 3 of the drawing, the angle of the surface on the flange 27 which contacts with the rubber ring 29 is disposed at an angle of 45 degrees relative to the axis of the cylinder, and the spring 33 is of such strength that it exerts a total force of 10 pounds on the washer 30. This embodiment is capable of effecting a perfect seal which will prevent leakage of air past the rear of the piston even when the piston is so actuated that it creates a vacuum equivalent to 18 or 20 inches of mercury. A force of only 2 pounds is required to move the piston in either direction. Tests have shown that this embodiment meets perfectly all conditions which are met in hydraulic brake service, and that this embodiment is capable of meeting even more severe conditions to which it was subjected in laboratory tests.

In the modification shown in Fig. 4, the surface of the flange 27' which contacts with the ring 29' is made perpendicular to the axis of the cylinder, whereas the surface of the washer 30' which contacts with this ring is disposed at an angle of approximately 55 degrees to the axis of the cylinder, so that the washer 30' presses the ring 29' against the flange 27' with greater force than the ring 29' is pressed against the cylinder wall. It is to be understood that this form of my invention is not limited to an embodiment in which the angular surface of the washer 30' is disposed at an angle of 55 degrees to the axis of the cylinder but that other engles may be used in lieu thereof.

While I have illustrated and described only one form of my invention, it is to be understood that my invention may assume numerous forms, and that the scope of my invention is limited solely by the following claims.

I claim:

1. In fluid pressure mechanism of the class described including a cylinder having a wall, the combination of a piston reciprocable therein, said piston having a flange, a rubber ring adapted to engage a surface of said flange and said cylinder wall, said ring having a normally circular cross-section, a circumferentially-continuous, floating washer having a surface adapted to engage said ring, one of said surfaces being inclined to the axis of said cylinder, and a spring urging said washer toward said flange.

2. In fluid pressure mechanism of the class described including a cylinder having a wall, the combination of a piston reciprocable therein, said piston having a flange, a rubber ring adapted to engage a surface of said flange and said cylinder wall, said ring having a normally circular cross-section, a circumferentially-continuous, floating washer having a surface adapted to engage said ring, one of said surfaces being inclined at an angle of approximately forty-five degrees to the axis of said cylinder, and a long spring urging said washer toward said flange.

3. In fluid pressure mechanism of the class described including a cylinder, the combination of a piston reciprocable therein, said piston having a recess terminating at one end in a flange, a resilient ring adapted to engage a surface of said flange and said cylinder wall, said ring having a normally circular cross-section, a circumferentially-continuous, floating washer having a surface adapted to engage said ring, one of said surfaces being inclined to the axis of said cylinder at an angle of substantially fifty-five degrees, and a spring urging said washer toward said flange.

4. In mechanism of the class described having a cylinder wall and a member reciprocable relatively thereto, the combination of sealing means comprising a resilient annulus engaging said wall and a surface of said member, said annulus being circular in cross-section, a circumferentially-continuous, rigid ring having a surface engaging said annulus, one of said surfaces being inclined at an angle lying between twenty-five degrees and fifty degrees to the axis of said cylinder wall, and resilient means urging said rigid ring toward said member.

5. In mechanism of the class described having a cylinder wall and a member reciprocable relatively thereto, the combination of sealing means comprising a rubber annulus engaging said wall and a surface of said member, said annulus being circular in cross-section, a circumferentially-continuous, rigid ring having a surface engaging said rubber annulus, the surface of said rigid ring being inclined at an angle of approximately fifty-five degrees relative to the axis of said cylinder wall, and resilient means urging said rigid ring toward said member.

6. In mechanism of the class described having a cylinder wall and a member reciprocable relatively thereto, the combination of sealing means comprising a rubber annulus engaging said wall and a surface of said member, said rubber annulus being circular in cross-section, a floating, circumferentially-continuous, rigid ring having a surface engaging said rubber ring, said surface of said member being inclined at an angle of approximately forty-five degrees relative to the axis of said cylinder wall, and resilient means urging said rigid ring toward said member.

7. In hydraulic brake mechanism of the class described including a cylinder having a wall, the combination of a piston reciprocable therein, said piston having a tapered recess merging into a cylindrical recess and a flange inclined at an angle of forty-five degrees relative to said cylinder wall, a rubber annulus having a circular cross-section and adapted to engage said flange and said wall, a circumferentially-continuous, rigid ring floating between said piston and said cylinder wall and having a surface perpendicular to said cylinder wall for engagement with said rubber annulus, and a helical spring located in said recess and extending almost the entire length of said piston for urging said ring against said annulus and toward said flange.

8. In hydraulic pressure mechanism including a cylinder having a wall, the combination of a piston reciprocable in said cylinder and having a radially-projecting flange, a rubber ring having a circular cross-section, a circumferentially-continuous, annular wedge radially floating between said piston and said cylinder wall, said wedge having a surface contacting with said ring and urging said ring against said flange and said wall, and resilient means acting on said wedge.

9. In hydraulic pressure mechanism including a cylinder having a cylinder wall, the combination of a two-part piston reciprocably mounted in contact with said wall, one part of said piston providing a flange extending toward said wall, a resilient plastic sealing ring engaging said flange and said wall, a circumferentially-continuous wedge forcing said ring against said flange and said wall, said wedge designed to create a greater force between said ring and said flange than between said ring and said wall, and a spring urging said wedge into contact with said ring, said spring abutting the other part of said piston.

10. In hydraulic pressure mechanism of the class described including a cylinder having a wall, the combination of a piston reciprocable in said cylinder and having a projecting flange extending toward said wall, a rubber ring, a circumferentially-continuous, annular wedge radially floating between said piston and said cylinder, said wedge having a surface contacting with said ring and urging said ring against said flange and said wall, and resilient means acting on said wedge.

11. A hydraulic pressure mechanism of the class described including a part providing a cylinder wall, comprising a two-part piston reciprocably mounted in contact with said wall, one part of said piston providing a flange extending toward said wall, a rubber ring engaging said flange and said wall, a radially floating, circumferentially-continuous member for forcing said ring against said flange and said wall, said ring being urged against said flange with greater force than against said wall, and a spring for urging said member into contact with said ring, said spring abutting the other part of said piston.

12. In hydraulic compression mechanism of the class described including means providing a cylinder bore, the combination of a member movable in said bore, said member providing a flange having a surface perpendicular to said bore, a rubber ring contacting with said surface and said bore, and circumferentially-continuous wedge means urging said ring into contact with said surface and said bore, said wedge means having a tapered surface forming an angle of approximately fifty-five degrees with the axis of said cylinder.

13. In hydraulic pressure mechanism including a cylinder having a wall, the combination of a two-part piston reciprocable within said wall, means for reciprocating said piston, said piston having a radially-extending flange, a rubber ring of circular cross-section engaging one side of said flange, a wedge-shaped, circumferentially-continuous metallic member radially floating between said piston and said wall, and a relatively long helical spring extending almost the full length of said piston and urging said wedge against said ring.

14. In a fluid pressure mechanism of the class described including a cylinder having a wall, the combination of a piston reciprocable therein, said piston having a flange provided with a surface inclined to the axis of said cylinder, a rubber ring adapted to engage the surface of said flange and said cylinder wall, said ring having a normally circular cross-section, a circumferentially-continuous floating washer having a surface adapted to engage said ring, said last-named surface being perpendicular to the axis of said cylinder, and a spring urging said washer toward said flange.

HERBERT C. BOWEN.